(12) United States Patent
Lehman et al.

(10) Patent No.: US 12,509,403 B2
(45) Date of Patent: Dec. 30, 2025

(54) INSULATING CERAMIC PANELS AND METHODS OF FORMING INSULATING CERAMIC PANELS

(71) Applicant: The Boeing Company, Chicago, IL (US)

(72) Inventors: Stephen E. Lehman, Melbourne Beach, FL (US); Kayleigh Porter, Los Angeles, CA (US); Tobias A. Schaedler, Oak Park, CA (US)

(73) Assignee: The Boeing Company, Arlington, VA (US)

( * ) Notice: Subject to any disclaimer, the term of this patent is extended or adjusted under 35 U.S.C. 154(b) by 1002 days.

(21) Appl. No.: 17/665,337

(22) Filed: Feb. 4, 2022

(65) Prior Publication Data

US 2022/0267218 A1 Aug. 25, 2022

Related U.S. Application Data

(60) Provisional application No. 63/153,499, filed on Feb. 25, 2021.

(51) Int. Cl.
| | |
|---|---|
| *B29C 64/165* | (2017.01) |
| *B28B 1/00* | (2006.01) |
| *B29C 64/35* | (2017.01) |
| *B29C 67/24* | (2006.01) |
| *B33Y 10/00* | (2015.01) |
| *B33Y 40/20* | (2020.01) |
| *C04B 35/63* | (2006.01) |
| *C04B 111/00* | (2006.01) |

(52) U.S. Cl.
CPC .......... *C04B 35/6303* (2013.01); *B28B 1/001* (2013.01); *B29C 67/242* (2013.01); *C04B 2111/00181* (2013.01); *C04B 2235/52* (2013.01)

(58) Field of Classification Search
CPC ....... B28B 1/001; B29C 64/165; B29C 64/35; B29C 67/242; B29C 71/02; B33Y 10/00; B33Y 40/20; C04B 2111/00181
USPC ................................ 264/113, 128, 233, 236
See application file for complete search history.

(56) References Cited

U.S. PATENT DOCUMENTS

| | | | |
|---|---|---|---|
| 10,647,618 B2 | 5/2020 | Schaedler | |
| 2018/0079134 A1* | 3/2018 | Tomko | B29C 64/165 |
| 2019/0329491 A1* | 10/2019 | Yu | B29C 64/165 |

* cited by examiner

*Primary Examiner* — Leo B Tentoni
(74) *Attorney, Agent, or Firm* — Kolitch Romano Dascenzo Gates LLC

(57) ABSTRACT

Insulating ceramic panels and methods of forming insulating ceramic panels are disclosed herein. The insulating ceramic panels include a plurality of hollow particles and an oxide binder. The plurality of hollow particles are formed from a hollow particle material that includes a metal oxide. The plurality of hollow particles defines an average equivalent particle diameter of at least 10 micrometers (μm) and at most 500 μm. In addition, the plurality of hollow particles defines an average wall thickness that is at least 3% and at most 30% of the average equivalent particle diameter. The oxide binder material attaches each hollow particle to at least one other hollow particle and differs from the hollow particle material. The insulating ceramic panels define a particle-enclosed void volume fraction, which is enclosed within the plurality of hollow particles, and an interstitial void volume fraction, which is defined within an interstitial space among the plurality of hollow particles.

20 Claims, 5 Drawing Sheets

INSULATING CERAMIC PANELS AND METHODS OF FORMING INSULATING CERAMIC PANELS

RELATED APPLICATION

The present application is a non-provisional of and claims priority to U.S. Provisional Patent Application No. 63/153,499, filed on Feb. 25, 2021, entitled "INSULATING CERAMIC PANELS AND METHODS OF FORMING INSULATING CERAMIC PANELS," the complete disclosure of which is incorporated by reference.

FIELD

The present disclosure relates generally to insulating ceramic panels and/or to methods of forming insulating ceramic panels and more particularly to insulating ceramic panels that include and/or utilize hollow particles.

BACKGROUND

Insulating ceramic panels are utilized in a variety of applications, including within the aerospace industry. Conventional insulating ceramic panels are costly to form and/or may be relatively heavy, both of which limit applications where the conventional insulating ceramic panels are utilized. In addition, it is difficult, or even impossible to fabricate conventional insulating ceramic panels that define complex, arcuate, and/or nonlinear surface profiles and/or internal features. Thus, there exists a need for improved insulating ceramic panels and/or for improved methods of forming insulating ceramic panels.

SUMMARY

Insulating ceramic panels and methods of forming insulating ceramic panels are disclosed herein. The insulating ceramic panels include a plurality of hollow particles and an oxide binder. The plurality of hollow particles are formed from a hollow particle material that includes a metal oxide. The plurality of hollow particles defines an average equivalent particle diameter of at least 10 μm and at most 500 μm. In addition, the plurality of hollow particles defines an average wall thickness that is at least 3% and at most 30% of the average equivalent particle diameter. The oxide binder material attaches each hollow particle to at least one other hollow particle and differs from the hollow particle material. The insulating ceramic panels define a particle-enclosed void volume fraction, which is enclosed within the plurality of hollow particles, and an interstitial void volume fraction, which is defined within an interstitial space among the plurality of hollow particles.

The methods include binder jet printing a printed panel that includes a plurality of hollow particles and a binder jet binder material, which attaches each hollow particle to at least one other hollow particle. The methods also include infusing an interstitial void volume fraction of the printed panel with an oxide binder material solution, which includes an oxide binder material and a solvent, to define a solution-infused panel. The methods further include heating the solution-infused panel. The heating includes evaporating a solvent, degrading the binder jet binder material, depositing the oxide binder material on the plurality of hollow particles such that the oxide binder material attaches each hollow particle of the plurality of hollow particles to at least one other hollow particle of the plurality of hollow particles, and fusing the plurality of hollow particles to one another to define the insulating ceramic panel.

DESCRIPTION

Figure 1:
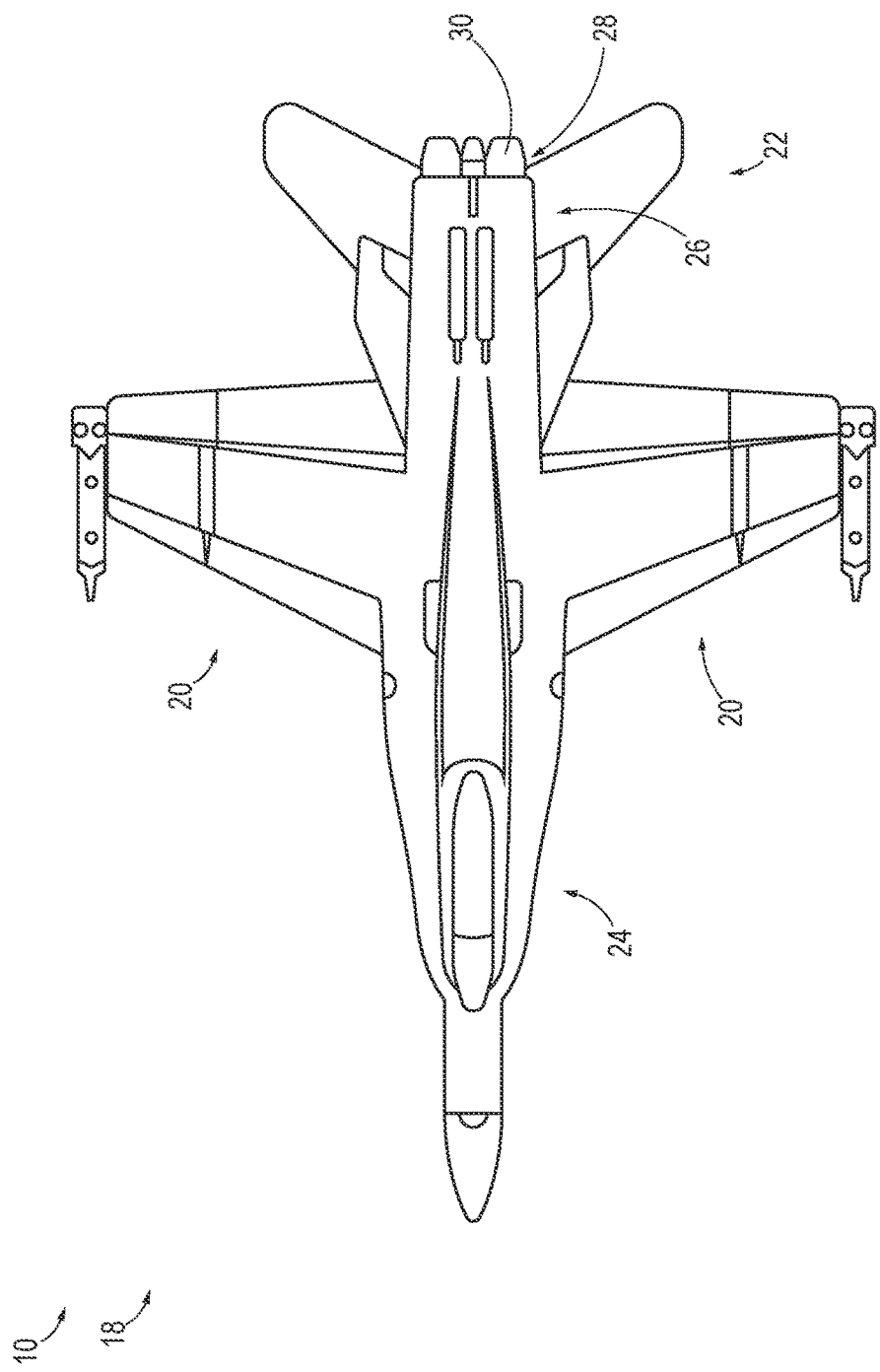
FIG. 1 is a schematic illustration of an example of a craft that includes and/or utilizes an insulating ceramic panel, according to the present disclosure.

FIGS. 1-6 provide illustrative, non-exclusive examples of insulating ceramic panels 30, of methods 100, and/or of craft 10 that include insulating ceramic panels 30, according to the present disclosure. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of an example of a craft 10 that includes and/or utilizes an insulating ceramic panel 30, according to the present disclosure. As illustrated in FIG. 1, craft 10, which in some examples is an aircraft 18, includes wings 20, a tail 22, an airframe 24, and an engine 26 that includes an afterburner 28. Afterburner 28 includes at least one insulating ceramic panel 30, according to the present disclosure, which may be utilized as an exhaust insulation panel for afterburner 28. As is known to those of skill in the art, afterburners, such as afterburner 28, produce and/or experience high temperatures and/or large temperature fluctuations. As such, materials that comprise afterburner 28 generally are selected to be heat-resistant and/or not to degrade when subjected to high temperatures and/or large temperature fluctuations.

While it is common to utilize conventional insulating ceramic panels within afterburners, such conventional insulating ceramic panels may be costly to form, thereby increasing an overall cost of craft 10. Additionally or alternatively, such conventional insulating ceramic panels cannot readily be formed with complex, arcuate, and/or nonlinear surface profiles and/or internal features. Insulating ceramic panels 30, according to the present disclosure, are relatively cheaper to fabricate, are relatively lighter, and readily may be formed with complex, arcuate, and/or nonlinear surface profiles and/or internal features, thereby providing distinct benefits over conventional insulating ceramic panels and/or permitting their utilization in applications where conventional insulating ceramic panels may not be effective.

Figure 2:
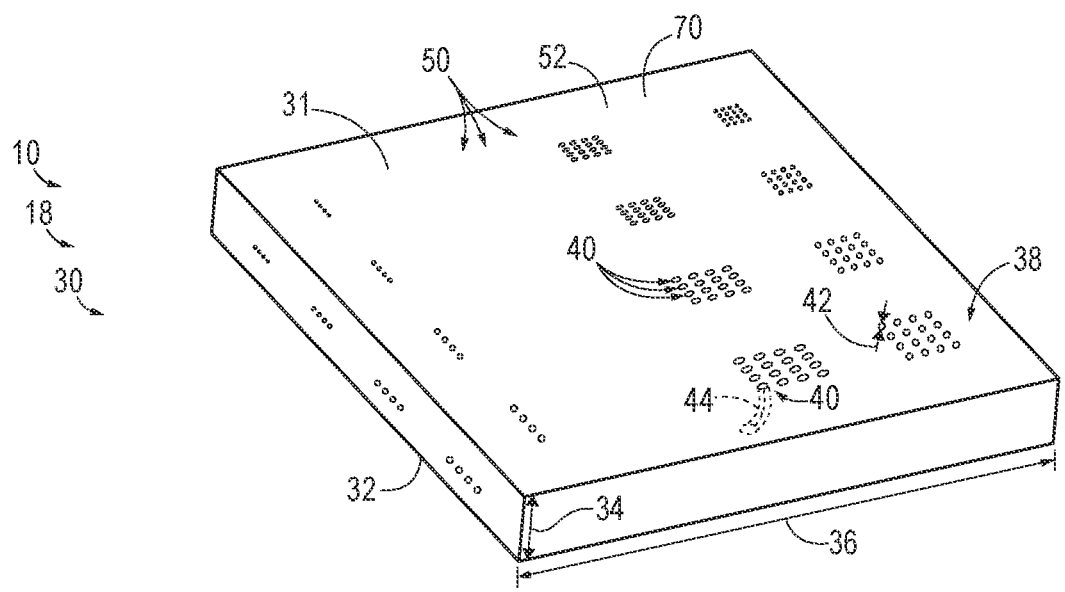
FIG. 2 is a schematic illustration of an example of an insulating ceramic panel according to the present disclosure.
Figure 3:
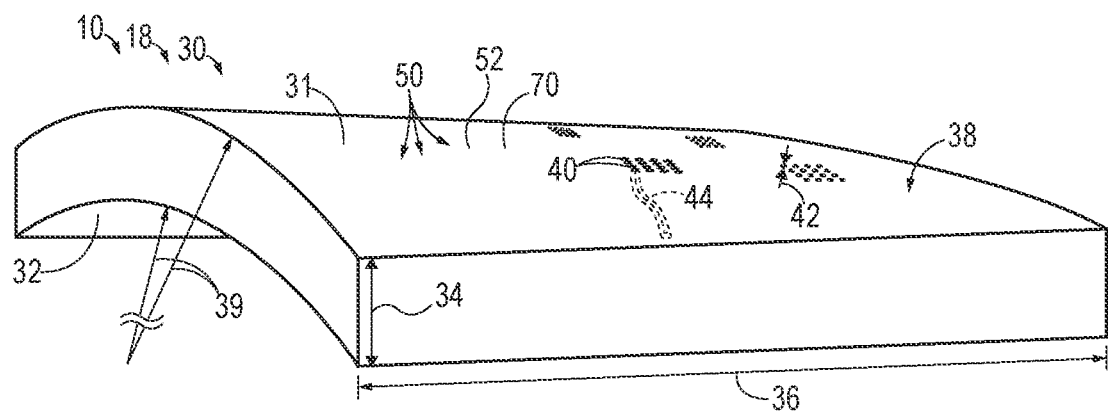
FIG. 3 is a schematic illustration of an example of an insulating ceramic panel according to the present disclosure.
Figure 4:
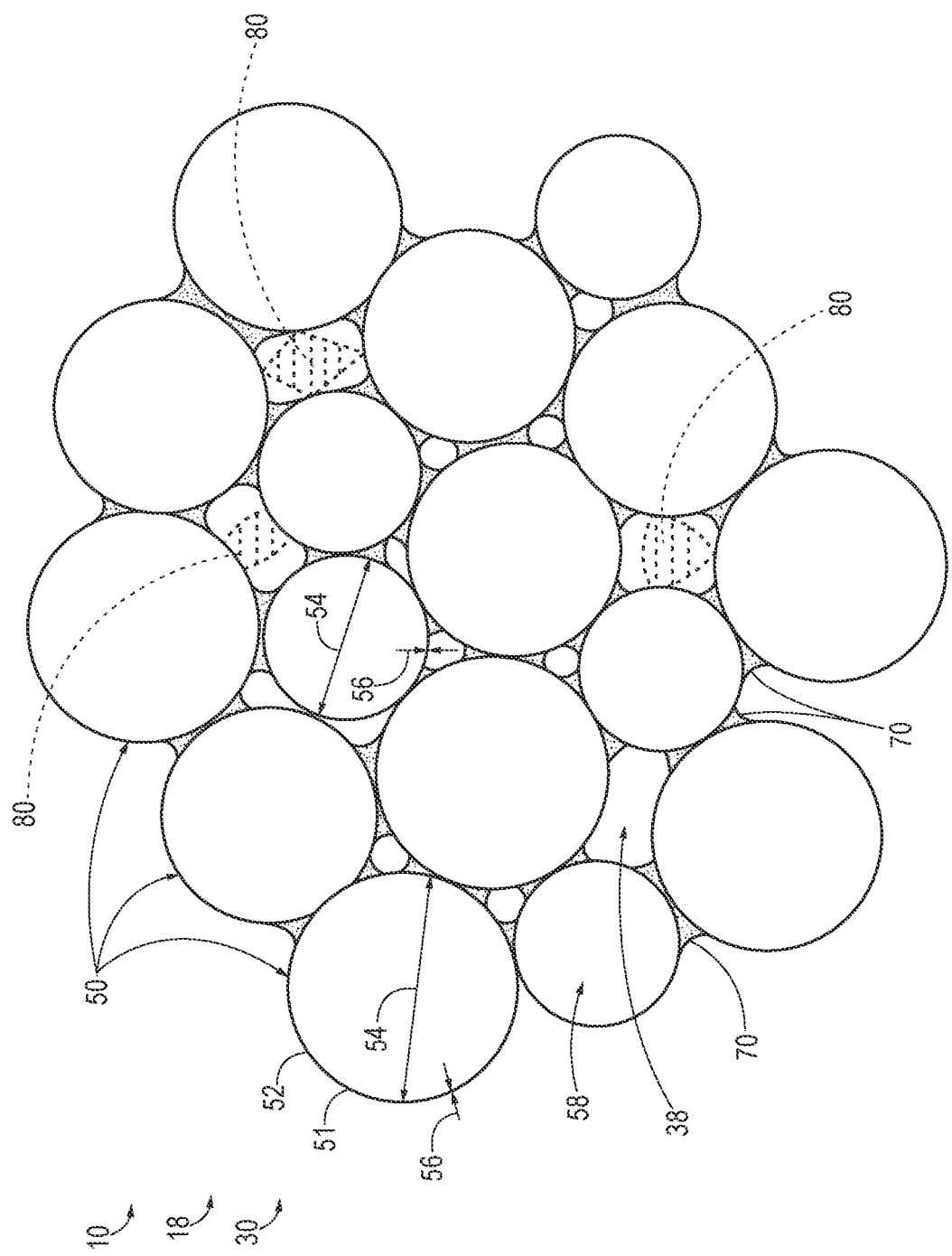
FIG. 4 is a schematic illustration of examples of a region of an insulating ceramic panel according to the present disclosure.

FIGS. 2-3 are schematic illustrations of examples of insulating ceramic panels 30 according to the present disclosure. FIG. 4 is a schematic illustration of examples of a region of an insulating ceramic panel 30 according to the present disclosure. As collectively illustrated by FIGS. 2-4, insulating ceramic panels 30 include a plurality of hollow particles 50, which are formed from a hollow particle material. The hollow particle material includes a metal oxide.

Insulating ceramic panels 30 also include an oxide binder material 70. As perhaps best illustrated in FIG. 4, oxide binder material 70 attaches each hollow particle 50 of the plurality of hollow particles 50 to at least one other hollow particle 50 of the plurality of hollow particle 50. Oxide binder material 70 differs from hollow particle material 52.

As perhaps best illustrated in FIGS. 2-3, some examples of insulating ceramic panels 30 have and/or define a panel thickness 34. Examples of panel thickness 34 include thicknesses of at least 0.5 centimeters (cm), at least 1 cm, at least 1.5 cm, at least 2 cm, at least 2.5 cm, at least 3 cm, at least 4 cm, at least 5 cm, at most 8 cm, at most 7 cm, at most 6 cm, at most 5 cm, at most 4 cm, at most 3 cm, and/or at most 2 cm.

As also illustrated in FIGS. 2-3, some examples of insulating ceramic panels 30 have and/or define a maximum extent 36. In some such examples, maximum extent 36 is a threshold multiple of panel thickness 34. Examples of the threshold multiple include threshold multiples of at least 2, at least 4, at least 6, at least 8, at least 10, at least 15, at least 20, at least 25, at least 30, at most 100, at most 80, at most 60, at most 40, and/or at most 20.

With continued reference to FIGS. 2-3, some examples of insulating ceramic panels 30 include and/or define a first major surface 31 and a second major surface 32. In some such examples, second major surface 32 is opposed to first major surface 31 and/or panel thickness 34 is defined, or measured, between first major surface 31 and second major surface 32. In some examples, and as illustrated in FIG. 2, first major surface 31 is a planar, or at least substantially planar, first major surface 31. Similarly, and in some such examples, second major surface 32 is a planar, or at least substantially planar, second major surface 32. In some examples, and as illustrated in FIG. 3, first major surface 31 is a nonplanar first major surface 31. Similarly, and in some such examples, second major surface 32 is a nonplanar second major surface 32. In some such examples, these nonplanar surfaces define at least one radius of curvature 39. Examples of radius of curvature 39 include radii of at least 10 centimeters (cm), at least 15 cm, at least 20 cm, at least 25 cm, at least 30 cm, at least 35 cm, at most 100 cm, at most 90 cm, at most 80 cm, at most 70 cm, at most 60 cm, at most 50 cm, at most 40 cm, and/or at most 30 cm.

In some examples, insulating ceramic panels 30 include and/or define a plurality of cooling holes 40. In some such examples, cooling holes 40 extend between first major surface 31 and second major surface 32, as illustrated in dashed lines in FIGS. 2-3. In some such examples, at least one cooling hole 40 defines a curved, or an arcuate, trajectory between first major surface 31 and second major surface 32, as indicated at 44 in FIGS. 2-3. In some such examples, cooling holes 40 have and/or define a hole diameter, an average diameter, and/or an effective diameter 42. Examples of hole diameter 42 include diameters of at least 0.25 millimeters (mm), at least 0.5 mm, at least 0.75 mm, at least 1 mm, at least 1.5 mm, at least 2 mm, at most 3 mm, at most 2.5 mm, at most 2 mm, at most 1.5 mm, and/or at most 1 mm.

Hollow particle 50 may have and/or define any suitable hollow particle shape. In various examples, hollow particles 50 include and/or are a plurality of spherical hollow particles 50, a plurality of at least substantially spherical hollow particles 50, and/or a plurality of at least partially spherical hollow particles 50.

In some examples, hollow particles 50 define an average equivalent particle diameter 54, as illustrated in FIG. 4. Examples of average equivalent particle diameter 54 include diameters of at least 10 micrometers (μm), at least 20 μm, at least 30 μm, at least 40 μm, at least 50 μm, at least 75 μm, at least 100 μm, at least 200 μm, at least 300 μm, at least 400 μm, at most 500 μm, at most 450 μm, at most 400 μm, at most 350 μm, at most 300 μm, at most 250 μm, at most 200 μm, at most 150 μm, at most 100 μm, and/or at most 50 μm. As used herein, the phrase "average equivalent particle diameter" refers to the diameter of a sphere with the same volume as the average volume of the plurality of hollow particles 50. In various examples, the average volume is a mean volume of the plurality of hollow particles 50, a median volume of the plurality of hollow particles 50, or a mode volume of the plurality of hollow particles 50.

In some examples, hollow particles 50 define an average wall thickness 56, as illustrated in FIG. 4. Examples of average wall thickness 56 include thicknesses of at least 3%, at least 4%, at least 5%, at least 6%, at least 8%, at least 10%, at least 15%, at least 20%, at most 30%, at most 25%, at most 20%, at most 15%, at most 10%, at most 8%, at most 6%, and/or at most 4% of average equivalent particle diameter 54. As used herein, the phrase, "average wall thickness" refers to the mean, median, or mode thickness of an outer wall 51 of hollow particles 50.

Hollow particle material 52 may include and/or be any suitable material and/or materials. An example of hollow particle material 52 is a ceramic hollow particle material. Additional examples of hollow particle material 52 include silica, alumina, high alumina silicate, aluminosilicate, zirconia, a rare earth silicate, such as yttrium monosilicate ($Y_2SiO_5$), yttrium disilicate ($Y_2Si_2O_7$), ytterbium monosilicate ($Yb_2SiO_5$), or ytterbium disilicate ($Yb_2Si_2O_7$), a rare earth aluminate, such as yttrium aluminate ($Y_4Al_2O_9$) or barium strontium aluminum silicate ($Ba1-xSrxAl_2Si_2O_3$), a mullite, a glass, a silicate glass, a zirconiate perovskite, such as $BaZrO_3$, $BaHfO_3$, and/or a titanate, such as hafnium titanate ($HfTiO_4$) or zirconium titanate ($ZrTiO_4$).

As a further example, hollow particles 50 and/or hollow particle material 52 thereof includes pulverized fuel ash from a coal-fired power plant. Such materials, when utilized, may be relatively low-cost to obtain and/or may facilitate beneficial re-use, recycling, and/or repurposing of a waste material that otherwise would be disposed of and/or destroyed.

In some examples, insulating ceramic panels 30 define a particle-enclosed volume fraction, which is enclosed by the plurality of hollow particles 50. Examples of the particle-enclosed volume fraction include volume fractions at least 5%, at least 10%, at least 15%, at least 20%, at least 25%, at least 30%, at least 35%, at least 40%, at least 45%, at least 50%, at least 55%, at least 60%, at least 65%, at least 70%, at most 85%, at most 80%, at most 75%, at most 70%, at most 65%, at most 60%, at most 55%, at most 50%, at most 45%, and/or at most 40%.

As used herein, the phrase "particle-enclosed volume fraction" refers to a ratio of a total enclosed, or encapsulated, volume of all hollow particles 50, within a given insulating ceramic panel 30, divided by an overall volume of given insulating ceramic panel 30. Stated another way, each hollow particle 50 defines a corresponding enclosed, or encapsulated, volume 58, and the total enclosed, or encapsulated, volume of all hollow particles 50 may be a sum of enclosed volumes 58 for each hollow particle included within given insulating ceramic panel 30. Additionally or alternatively, the overall volume of given insulating ceramic panel 30 is the volume that is bounded by the external surfaces of given insulating ceramic panel 30.

In some examples, insulating ceramic panels 30 define an interstitial void volume fraction, which is defined within an interstitial space 38 among the plurality of hollow particles 50. Examples of the interstitial void volume fraction include volume fractions of at least 10%, at least 15%, at least 20%, at least 25%, at least 30%, at least 35%, at least 40%, at least 45%, at least 50%, at least 55%, at least 60%, at least 65%, at most 75%, at most 70%, at most 65%, at most 60%, at most 55%, at most 50%, at most 45%, at most 40%, at most 35%, at most 30%, at most 25%, and/or at most 20%. As used herein, the phrase "interstitial void volume fraction" refers to a ratio of a total volume of interstitial space 38, within given insulating ceramic panel 30, divided by the overall volume of given insulating ceramic panel 30.

In some examples, the plurality of hollow particles defines a threshold particle mass fraction of the insulating ceramic panel. Examples of the threshold particle mass fraction include mass fractions of at least 60%, at least 65%, at least 70%, at least 75%, at least 80%, at least 85%, at least 90%, at most 99%, at most 98%, at most 97%, at most 96%, at most 95%, at most 90%, at most 85%, at most 80%, and/or at most 75%.

Oxide binder material 70 may include and/or be any suitable material that attaches each hollow particle 50 to at least one other hollow particle 50 and/or that differs from hollow particle material 52. Examples of oxide binder material 70 include a metal oxide hydroxide, a metal oxide hydrate, an alumina hydrate, an aluminum oxide hydroxide, and/or an alumina boehmite. Additional examples of oxide binder material 70 include, consist of, and/or consist essentially of an aluminum oxide and/or a crystalline aluminum oxide.

In some examples, insulating ceramic panels 30, including hollow particles 50 and/or oxide binder material 70 thereof, may be configured, formulated, and/or selected to withstand a threshold temperature and/or to resist degradation when subjected to the threshold maximum temperature. Examples of the threshold maximum temperature include temperatures of at least 900 degrees Celsius (° C.), at least 1,000° C., at least 1,100° C., at least 1,200° C., at least 1,300° C., at least 1,400° C., at least 1,500° C., at least 1,600° C., or at least 1,700° C.

In some examples, oxide binder material 70 defines a threshold binder material mass fraction of insulating ceramic panels 30. Examples of the threshold binder material mass fractions include mass fractions of at least 1%, at least 2%, at least 4%, at least 6%, at least 8%, at least 10%, at least 15%, at most 30%, at most 25%, at most 20%, at most 15%, at most 10%, and/or at most 5%.

As discussed in more detail herein with reference to methods 100, some examples of insulating ceramic panels 30, according to the present disclosure, are formed, defined, and/or fabricated utilizing a 3-D printing process, such as a binder jetting process and/or a binder jet printing process. Some such 3-D printing processes utilize a binder jet binder material 80 to adhere hollow particles 50 to one another. In some such examples, insulating ceramic panels 30 further include binder jet binder material 80. In some such examples, binder jet binder material 80 attaches each hollow particle 50 of the plurality of hollow particles 50 to at least one other hollow particle 50 of the plurality of hollow particles 50. In some such examples, binder jet binder material 80 differs from oxide binder material 70 and/or from hollow particle material 52. In some such examples, binder jet binder material 80 is water-insoluble or at least substantially water-insoluble. In some such examples, binder jet binder material 80 is polymeric and/or phenolic.

In some such examples, binder jet binder material 80 is configured, formulated, and/or selected to degrade when subject to a threshold degradation temperature. Examples of the threshold degradation temperature include temperatures of at most 150° C., at most 200° C., at most 250° C., at most 300° C., at most 350° C., at most 400° C., at most 450° C. at most 500° C. at most 550° C. at most 600° C.

Incorporation of hollow particles 50 within insulating ceramic panels 30 may permit and/or facilitate formation of such insulating ceramic panels with relatively low panel densities and/or with relatively low panel thermal conductivities. Examples of the panel densities include densities of at least 0.1 grams per cubic centimeter (g/cc), at least 0.2 g/cc, at least 0.3 g/cc, at least 0.4 g/cc, at least 0.5 g/cc, at least 0.6 g/cc, at least 0.7 g/cc, at least 0.8 g/cc, at most 1 g/cc, at most 0.9 g/cc, at most 0.8 g/cc, at most 0.7 g/cc, at most 0.6 g/cc, at most 0.5 g/cc, at most 0.4 g/cc, at most 0.3 g/cc, and/or at most 0.2 g/cc. Examples of the panel thermal conductivities include thermal conductivities of at least 0.05 watts per meter Kelvin (W/mK), at least 0.1 W/mK, at least 0.2 W/mK, at least 0.3 W/mK, at least 0.4 W/mK, at most 0.5 W/mK, at most 0.4 W/mK, at least 0.3 W/mK, at most 0.2 W/mK, and/or at most 0.1 W/m K.

Figure 5:
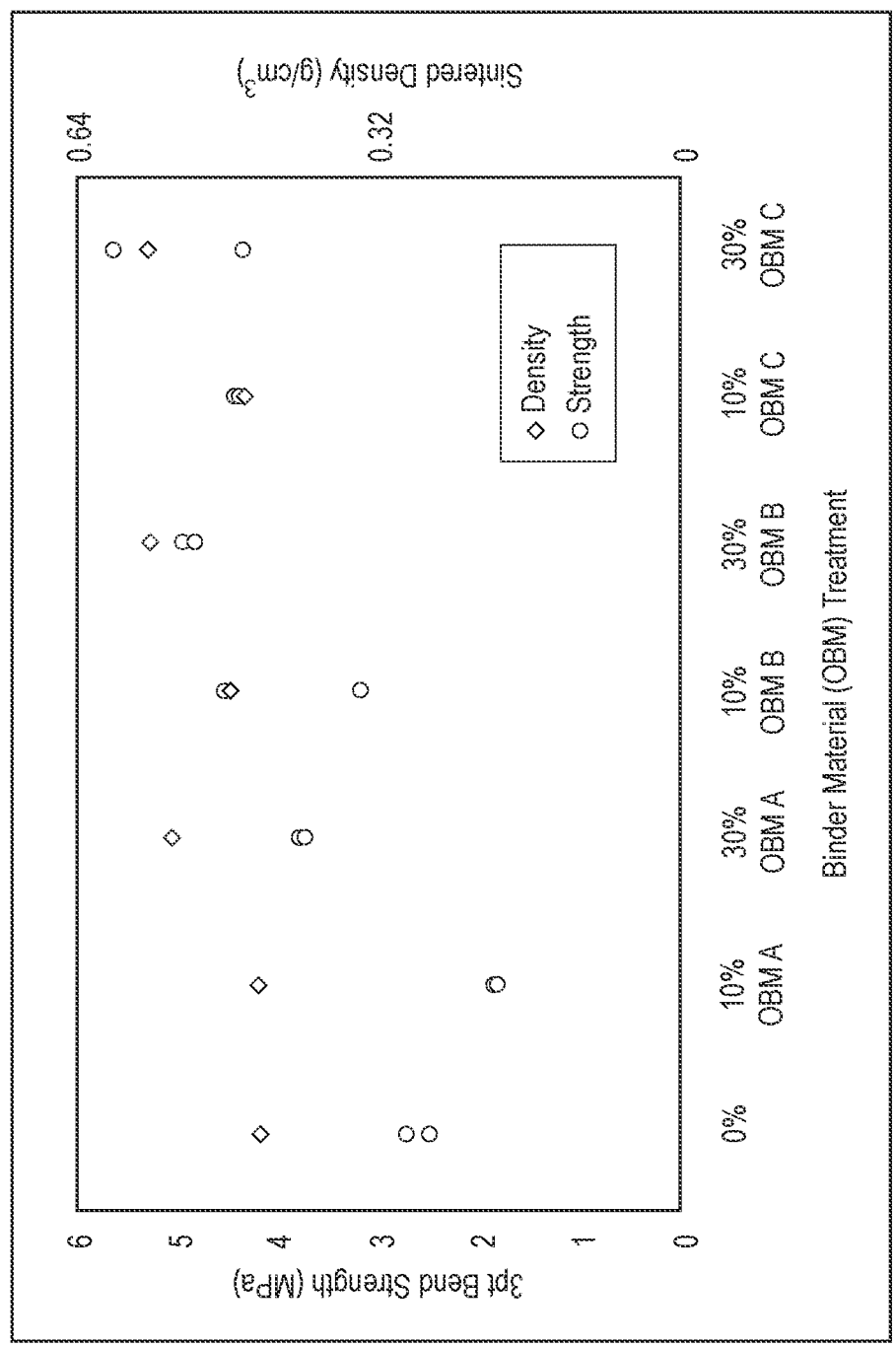
FIG. 5 is a plot illustrating examples of 3-point bend strength and density as a function of oxide binder material content for insulating ceramic panels according to the present disclosure.

Inclusion of oxide binder material 70 within insulating ceramic panels 30 may significantly increase a strength and/or durability of insulating ceramic panels 30 without a corresponding increase in density of the insulating ceramic panels. Stated another way, inclusion of oxide binder material 70 within insulating ceramic panels 30 may provide a disproportionate increase in the strength and/or durability of the insulating ceramic panels relative to the corresponding increase in density due to inclusion of oxide binder material 70. This is illustrated in FIG. 5, which is a plot illustrating examples of 3-point bend strength and density as a function of oxide binder material 70 mass fraction for insulating ceramic panels 30, according to the present disclosure. As illustrated by the diamonds of FIG. 5, incorporation of a mass fraction of up to 30% oxide binder material 70 into insulating ceramic panels 30 only increases the density of insulating ceramic panels 30 by at most approximately 40%. However, that same incorporation of oxide binder material 70 increases the 3-point bend strength of insulating ceramic panels 30 by up to 120%.

Figure 6:
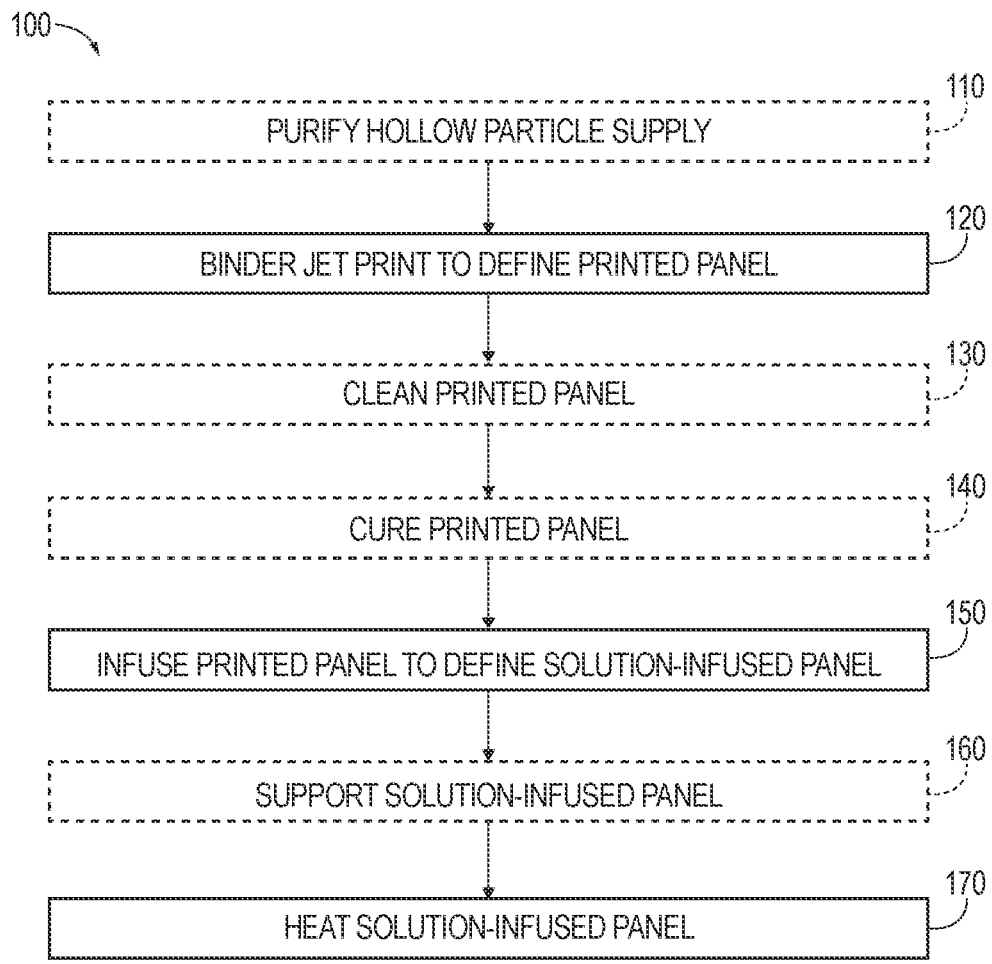
FIG. 6 is a flowchart depicting methods of forming an insulating ceramic panel, according to the present disclosure.

FIG. 6 is a flowchart depicting methods 100 of forming an insulating ceramic panel, according to the present disclosure. Methods 100 may include purifying a hollow particle supply at 110 and include binder jet printing to define a printed panel at 120. Methods 100 also may include cleaning the printed panel at 130 and/or curing the printed panel at

140. Methods 100 also include infusing the printed panel to define a solution-infused panel at 150 and may include supporting the solution-infused panel at 160. Methods 100 further include heating the solution-infused panel at 170. Examples of the insulating ceramic panel are disclosed herein with reference to insulating ceramic panel 30 of FIGS. 1-5.

Purifying the hollow particle supply at 110, when performed, includes purifying the hollow particle supply to separate the plurality of hollow particles from a remainder of the hollow particle supply. In some examples, the purifying at 110 includes selecting a subset of the hollow particle supply as the plurality of hollow particles. In some such examples, the purifying includes screening the hollow particle supply to generate the plurality of hollow particles.

In some examples, the purifying includes selectively separating a fines fraction of the hollow particle supply from the hollow particle supply to generate the plurality of hollow particles. In some such examples, the fines fraction of the hollow particle supply has an average equivalent fines diameter that is less than a threshold fines diameter. Examples of the threshold fines diameter include diameters of 10 μm, 20 μm, 30 μm, 40 μm, 50 μm, 75 μm, 100 μm, 200 μm, 300 μm, or 400 μm.

In some examples, the purifying at 110 includes selectively separating a coarse fraction of the hollow particle supply from the hollow particle supply to generate the plurality of hollow particles. In some such examples, the coarse fraction of the hollow particle supply has an average equivalent coarse diameter that is greater than a threshold coarse diameter. Examples of the threshold coarse diameter include diameters of 500 μm, 450 μm, 400 μm, 350 μm, 300 μm, 250 μm, 200 μm, 150 μm, 100 μm, or 50 μm.

In some examples, the purifying at 110 includes selectively separating broken hollow particles from the hollow particle supply to generate the plurality of hollow particles. In some such examples, the separating the broken hollow particles includes floating at least a subset of the hollow particle supply and selecting a floating fraction of the subset of the hollow particle supply as the plurality of hollow particles. In some such examples, the separating the broken hollow particles includes centrifuging the subset of the hollow particle supply and selecting an unbroken fraction of the subset of the hollow particle supply as the plurality of hollow particles.

In some examples, the purifying at 110 is performed prior to the binder jet printing at 120. The purifying at 110, when performed, may improve one or more properties of the insulating ceramic panel and/or may improve a reliability of a remainder of methods 100. In some examples, the purifying at 110 permit methods 100 to produce a more uniform, or a more uniformly durable, insulating ceramic panel when compared to methods 100 that utilize an entirety of the hollow particle supply, that utilize broken hollow particles within the insulating ceramic panels, and/or that utilize a wide range of hollow particles sizes within the insulating ceramic panels. In some examples, the purifying at 110 may decrease a potential for dust formation during the binder jet printing at 120, thereby decreasing a potential for clogging of a nozzle utilized to apply the binder jet binder material during the binder jet printing at 120.

An example of the purifying at 110 was reduced to practice as follows. A lightweight, inert, hollow, alumina silicate microsphere, which was a byproduct of coal combustion at thermal power plants that produce fly ash, was utilized as the hollow particle supply. The microspheres, which also may be referred to herein as cenospheres, included 50-60% silica, 28-42% alumina, and 1.5-5% iron. The size of the microspheres ranged from 0.1 μm to 300 μm.

These microspheres did not 3-D print well, as the ultrafine lightweight particles plumed during the binder application and clogged the binder jetting nozzle. In addition, the resulting printed panel did not sinter well, as raw material impurities impact part-to-part consistency, often resulting in cracking and/or poor part integrity.

To overcome these issues, the microspheres were purified, such as during the purifying at 110, to generate the plurality of hollow particles utilized during the binder jet printing at 120. More specifically, the microspheres were sieved to a particle size distribution between 50 μm and 250 μm and the broken sphere content was reduced to <0.5%. In order to separate the sinker material from the floating material and remove fine particles with diameters of less than 50 μm, the microspheres were sieved through a screen, floated in water, separated, and then dried. Scanning electron microscopy, particle size distribution analysis, and a 250 mL separatory funnel to measure the percentage of sinkers were utilized as quality control measures to verify the composition of the resultant hollow particles. This process resulted in >99.5% spherical particles that readily are 3-D printed during the binder jet printing at 120 with little to no dust plume and good recoating powder flow behavior.

Binder jet printing to define the printed panel at 120 includes binder jet printing a printed panel that includes a plurality of hollow particles and a binder jet binder material. The binder jet binder material attaches each hollow particle of the plurality of hollow particles to at least one other hollow particle of the plurality of hollow particles. Examples of the plurality of hollow particles are disclosed herein with reference to hollow particles 50. Examples of the binder jet binder material are disclosed herein with reference to binder jet binder material 80.

In some examples, the binder jet printing at 120 includes additively manufacturing the printed panel. In some examples, the binder jet printing at 120 includes forming, or repeatedly forming, a thin layer of hollow particles and selectively positioning, or repeatedly positioning, the binder jet binder material within the thin layer of hollow particles to selectively bind a subset of the thin layer of hollow particles to one another.

Cleaning the printed panel at 130, when performed, includes cleaning the printed panel in any suitable manner, such as to remove residue from the printed panel and/or to remove unattached hollow particles from the printed panel. In various examples, the cleaning at 130 includes utilizing a fluid stream, a gas stream, a liquid stream, and/or a volume of liquid to clean the printed panel, to remove undesired material from the printed panel, and/or to remove unattached hollow particles from the printed panel. In some examples, the cleaning at 130 is performed subsequent to the binder jet printing at 120 and/or prior to the infusing at 150.

Curing the printed panel at 140, when performed, includes curing the printed panel in any suitable manner. In some examples, the curing at 140 includes heating the printed panel, such as to a cure temperature. The cure temperature may be sufficient to cure, or to set, the binder jet binder material. Examples of the cure temperature include temperatures of at least 100° C., at least 125° C., at least 150° C., at least 175° C., at least 200° C., at most 300° C., at most 250° C., and/or at most 200° C. In some examples, the curing at 140 is performed subsequent to the binder jet printing at 120, subsequent to the cleaning at 130, and/or prior to the infusing at 150.

Infusing the printed panel to define the solution-infused panel at 150 includes infusing an interstitial void volume fraction of the printed panel with an oxide binder material solution. The oxide binder material solution includes an oxide binder material and a solvent. Examples of the oxide binder material are disclosed herein with reference to oxide binder material 70. Examples of the interstitial void volume fraction are disclosed herein.

In some examples, the infusing at 150 includes positioning the oxide binder material solution within the interstitial void volume fraction of the printed panel and/or within an interstitial space of the printed panel. Examples of the interstitial space are disclosed herein with reference to interstitial space 38. In some examples, the infusing at 150 includes immersing the printed panel within the oxide binder material solution. In some examples, the infusing at 150 includes vacuum infiltrating the oxide binder material into the printed panel.

In some examples, the solvent includes, consists of, or consists essentially of water. With this in mind, and as discussed, utilization of the water-insoluble binder jet binder material, during the binder jet printing at 120, may permit and/or facilitate performing the infusing at 150 without degradation and/or dissolution of the binder jet binder material. Stated another way, methods 100 permit and/or facilitate performing the infusing at 150 while maintaining a shape and/or a structural integrity of the printed panel.

In some examples, the infusing at 150 is performed subsequent to the binder jet printing at 120, subsequent to the cleaning at 130, and/or subsequent to the curing at 140. In some examples, the infusing at 150 is performed prior to the supporting at 160 and/or prior to the heating at 170.

Supporting the solution-infused panel at 160, when performed, includes supporting a lower surface of the solution-infused panel prior to and/or during the heating at 170. The supporting at 160 may decrease a potential for deformation of, damage to, and/or cracking of the solution-infused panel during the heating at 170.

In some examples, the solution-infused panel defines a lower surface contour and the supporting at 160 includes supporting with an upper surface of a support structure. In some such examples, the upper surface of the support structure defines an upper surface contour that corresponds to, or matches, the lower surface contour of the solution-infused panel. In some such examples, the lower surface contour is a planar lower surface contour and the upper surface contour is a planar upper surface contour. In some such examples, the lower surface contour is a non-planar lower surface contour and the upper surface contour is a non-planar upper surface contour.

In some examples, methods 100 further include positioning a particulate material between the support structure and the solution-infused paneling during the heating. In some such examples, the positioning the particulate material decreases a frictional force between the support structure and the solution-infused panel. In some such examples, this decrease in friction permits increased relative motion between the support structure and the solution-infused panel, such as may result from thermal expansion and/or contraction of the support structure and/or of the solution-infused panel. Examples of the particulate material include a spherical, or at least substantially spherical, particulate material, a calcined zirconia milling media, and/or a high-temperature particulate material selected to remain solid during the heating.

Heating the solution-infused panel at 170 includes heating the solution-infused pane in any suitable manner and/or utilizing any suitable structure, such as to generate the insulating ceramic panel. As an example, the heating at 170 may include positioning the solution-infused panel within an oven and heating the solution-infused panel within the oven. In some examples, the heating at 170 includes heating the solution-infused panel to a threshold fusing temperature. Examples of the threshold fusing temperature include temperatures of at least 800° C., at least 900° C., at least 1,000° C., at least 1,100° C., at least 1,200° C., at least 1,300° C., at least 1,400° C., at least 1,500° C., at least 1,600° C., at least 1,700° C., at least 1,800° C., at least 1,900° C., at most 2,000° C., at most 1,800° C., at most 1,600° C., at most 1,400° C., at most 1,200° C., and/or at most 1,000° C.

In some examples, the heating at 170 includes evaporating the solvent. In some such examples, the evaporating includes drying the solution-infused panel for a threshold evaporation time and/or at a threshold evaporation temperature. Examples of the threshold evaporation time include times of at least 2 hours, at least 4 hours, at least 6 hours, at least 8 hours, at least 10 hours, at least 12 hours, at most 24 hours, at most 20 hours, at most 16 hours, at most 14 hours, and/or at most 12 hours. Examples of the threshold evaporation temperature include temperatures of at least 50° C., at least 60° C., at least 70° C., at least 80° C., at least 90° C., at least 100° C., at most 200° C., at most 180° C., at most 160° C., at most 140° C., at most 120° C., and/or at most 100° C.

In some examples, the heating at 170 includes degrading the binder jet binder material. In some such examples, the degrading includes evaporating the binder jet binder material, oxidizing the binder jet binder material, decomposing the binder jet binder material, and/or melting the binder jet binder material. In some such examples, the degrading the binder jet binder material includes heating the binder jet binder material to greater than a threshold degradation temperature of the binder jet binder material, examples of which are disclosed herein.

In some examples, the heating at 170 includes depositing the oxide binder material on the plurality of hollow particles. In some such examples, the depositing includes depositing such that the oxide binder material attaches each hollow particle of the plurality of hollow particles to at least one other hollow particle of the plurality of hollow particles. In some such examples, the depositing the oxide binder material includes depositing metal oxide crystals within interface regions between adjacent hollow particles. In some such examples, the metal oxide crystals include alumina crystals. As discussed in more detail herein with reference to FIG. 5, deposition of the oxide binder material may cause a disproportionate increase in strength and/or durability of the resultant insulating ceramic panels.

In some examples, the heating at 170 includes fusing the plurality of hollow particles to one another to define the insulating ceramic panel. In some such examples, the fusing the plurality of hollow particles to one another includes forming a plurality of adhesions within corresponding interface regions between adjacent hollow particles. The fusing also may be referred to herein as sintering.

Illustrative, non-exclusive examples of inventive subject matter according to the present disclosure are described in the following enumerated paragraphs:

A1. An insulating ceramic panel (30), optionally formed via a binder jetting process, the insulating ceramic panel (30) comprising:

a plurality of hollow particles (50) formed from a hollow particle material (52) that includes a metal oxide, optionally wherein the plurality of hollow particles (50):
  (i) defines an average equivalent particle diameter (54) of at least 10 micrometers (μm) and at most 500 μm; and
  (ii) defines an average wall thickness (56) of at least 3% and at most 30% of the average equivalent particle diameter (54); and an oxide binder material (70) that attaches each hollow particle (50) of the plurality of hollow particles (50) to at least one other hollow particle (50) of the plurality of hollow particles (50), wherein the oxide binder material (70) differs from the hollow particle material (52);

optionally wherein the insulating ceramic panel (30) defines:
  (i) a particle-enclosed void volume fraction that is enclosed within the plurality of hollow particles (50); and
  (ii) an interstitial void volume fraction that is defined within an interstitial space (38) among the plurality of hollow particles (50).

A2. The insulating ceramic panel (30) of paragraph A1, wherein the plurality of hollow particles (50) includes, or is, at least one of:
  (i) a plurality of spherical hollow particles (50);
  (ii) a plurality of at least substantially spherical hollow particles (50); and
  (iii) a plurality of at least partially spherical hollow particles (50).

A3. The insulating ceramic panel (30) of any of paragraphs A1-A2, wherein the average equivalent particle diameter (54) of the plurality of hollow particles (50) is at least one of:
  (i) at least 20 μm, at least 30 μm, at least 40 μm, at least 50 μm, at least 75 μm, at least 100 μm, at least 200 μm, at least 300 μm, or at least 400 μm; and
  (ii) at most 450 μm, at most 400 μm, at most 350 μm, at most 300 μm, at most 250 μm, at most 200 μm, at most 150 μm, at most 100 μm, or at most 50 μm.

A4. The insulating ceramic panel (30) of any of paragraphs A1-A3, wherein the average wall thickness (56) of the plurality of hollow particles (50) is at least one of:
  (i) at least 4%, at least 5%, at least 6%, at least 8%, at least 10%, at least 15%, or at least 20% of the average equivalent particle diameter (54); and
  (ii) at most 25%, at most 20%, at most 15%, at most 10%, at most 8%, at most 6%, or at most 4% of the average equivalent particle diameter (54).

A5. The insulating ceramic panel (30) of any of paragraphs A1-A4, wherein the hollow particle material (52) is a ceramic hollow particle material.

A6. The insulating ceramic panel (30) of any of paragraphs A1-A5, wherein the hollow particle material (52) includes, consists of, or consists essentially of at least one of:
  (i) silica;
  (ii) alumina;
  (iii) a high alumina silicate;
  (iv) an aluminosilicate;
  (v) zirconia;
  (vi) a rare earth silicate;
  (vii) a rare earth aluminate;
  (viii) a mullite;
  (ix) a glass;
  (x) a silicate glass;
  (xi) a zirconate perovskite; and
  (xii) a titanate.

A7. The insulating ceramic panel (30) of any of paragraphs A1-A6, wherein the plurality of hollow particles (50) defines a threshold particle mass fraction of the insulating ceramic panel (30), optionally wherein the threshold particle mass fraction is at least one of:
  (i) at least 60%, at least 65%, at least 70%, at least 75%, at least 80%, at least 85%, and at least 90%; and
  (ii) at most 99%, at most 98%, at most 97%, at most 96%, at most 95%, at most 90%, at most 85%, at most 80%, or at most 75%.

A8. The insulating ceramic panel (30) of any of paragraphs A1-A7, wherein the interstitial void volume fraction of the insulating ceramic panel (30) is at least one of:
  (i) at least 10%, at least 15%, at least 20%, at least 25%, at least 30%, at least 35%, at least 40%, at least 45%, at least 50%, at least 55%, at least 60%, or at least 65%; and
  (ii) at most 75%, at most 70%, at most 65%, at most 60%, at most 55%, at most 50%, at most 45%, at most 40%, at most 35%, at most 30%, at most 25%, or at most 20%.

A9. The insulating ceramic panel (30) of any of paragraphs A1-A8, wherein the particle-enclosed void volume fraction of the insulating ceramic panel (30) is at least one of:
  (i) at least 5%, at least 10%, at least 15%, at least 20%, at least 25%, at least 30%, at least 35%, at least 40%, at least 45%, at least 50%, at least 55%, at least 60%, at least 65%, or at least 70%; and
  (ii) at most 85%, at most 80%, at most 75%, at most 70%, at most 65%, at most 60%, at most 55%, at most 50%, at most 45%, or at most 40%.

A10. The insulating ceramic panel (30) of any of paragraphs A1-A9, wherein the oxide binder material (70) includes, consists of, or consists essentially of at least one of:
  (i) a metal oxide hydroxide;
  (ii) a metal oxide hydrate;
  (iii) an alumina hydrate;
  (iv) an aluminum oxide hydroxide; and
  (v) an alumina boehmite.

A11. The insulating ceramic panel (30) of any of paragraphs A1-A10, wherein the oxide binder material (70) includes, consists of, or consists essentially of at least one of an aluminum oxide and a crystalline aluminum oxide.

A12. The insulating ceramic panel (30) of any of paragraphs A1-A11, wherein the oxide binder material (70) defines a threshold binder material mass fraction of the insulating ceramic panel (30), optionally wherein the threshold binder material mass fraction is at least one of:
  (i) at least 1%, at least 2%, at least 4%, at least 6%, at least 8%, at least 10%, or at least 15%; and
  (ii) at most 25%, at most 20%, at most 15%, at most 10%, or at most 5%.

A13. The insulating ceramic panel (30) of any of paragraphs A1-A12, wherein the oxide binder material (70) is selected to resist degradation when subjected to temperatures of at least 900 degrees Celsius (° C.), at least 1,000° C., at least 1,100° C., at least 1,200° C., at least 1,300° C., at least 1,400° C., at least 1,500° C., at least 1,600° C., or at least 1,700° C.

A14. The insulating ceramic panel (30) of any of paragraphs A1-A13, wherein the insulating ceramic panel (30) further includes a binder jet binder material (80) that attaches each hollow particle (50) of the plurality of hollow particles (50) to at least one other hollow particle (50) of the plurality of hollow particles (50), wherein the binder jet binder material (80) differs from both the oxide binder material (70) and the hollow particle material (52).

A15. The insulating ceramic panel (30) of paragraph A14, wherein the binder jet binder material (80) is water-insoluble.

A16. The insulating ceramic panel (30) of any of paragraphs A14-A15, wherein the binder jet binder material (80) is at least one of:
   (i) polymeric; and
   (ii) phenolic.

A17. The insulating ceramic panel (30) of any of paragraphs A14-A16, wherein the binder jet binder material (80) is selected to degrade when subjected to temperatures of at most 150° C., at most 200° C., at most 250° C., at most 300° C., at most 350° C., at most 400° C. at most 450° C. at most 500° C. at most 550° C. at most 600° C.

A18. The insulating ceramic panel (30) of any of paragraphs A1-A17, wherein the insulating ceramic panel (30) has a thickness of at least one of:
   (i) at least 0.5 centimeters (cm), at least 1 cm, at least 1.5 cm, at least 2 cm, at least 2.5 cm, at least 3 cm, at least 4 cm, or at least 5 cm; and
   (ii) at most 8 cm, at most 7 cm, at most 6 cm, at most 5 cm, at most 4 cm, at most 3 cm, or at most 2 cm.

A19. The insulating ceramic panel (30) of any of paragraphs A1-A18, wherein the insulating ceramic panel (30) has a/the thickness and a maximum extent that is a threshold multiple of the thickness, optionally wherein the threshold multiple is at least one of:
   (i) at least 2, at least 4, at least 6, at least 8, at least 10, at least 15, at least 20, at least 25, or at least 30; and
   (ii) at most 100, at most 80, at most 60, at most 40, or at most 20.

A20. The insulating ceramic panel (30) of any of paragraphs A1-A19, wherein the insulating ceramic panel (30) defines a first major surface (31) and a second major surface (32) that is opposed to the first major surface (31).

A21. The insulating ceramic panel (30) of paragraph A20, wherein at least one of:
   (i) the first major surface (31) is a planar, or at least substantially planar, first major surface (31); and
   (ii) the second major surface (32) is a planar, or at least substantially planar, second major surface (32).

A22. The insulating ceramic panel (30) of any of paragraphs A20-A21, wherein at least one of:
   (i) the first major surface (31) is a non-planar first major surface (31); and
   (ii) the second major surface (32) is a non-planar second major surface (32).

A23. The insulating ceramic panel (30) of any of paragraphs A20-A22, wherein the insulating ceramic panel (30) includes a plurality of cooling holes (40).

A24. The insulating ceramic panel (30) of paragraph A23, wherein each cooling hole (40) of the plurality of cooling holes (40) extends between the first major surface (31) and the second major surface (32).

A25. The insulating ceramic panel (30) of any of paragraphs A23-A24, wherein at least one cooling hole (40) of the plurality of cooling holes (40) extends along an arcuate trajectory (44) between the first major surface (31) and the second major surface (32).

A26. The insulating ceramic panel (30) of any of paragraphs A23-A25, wherein each cooling hole (40) of the plurality of cooling holes (40) has a hole diameter (42) of at least one of:
   (i) at least 0.25 millimeters (mm), at least 0.5 mm, at least 0.75 mm, at least 1 mm, at least 1.5 mm, or at least 2 mm; and
   (ii) at most 3 mm, at most 2.5 mm, at most 2 mm, at most 1.5 mm, or at most 1 mm.

A27. The insulating ceramic panel (30) of any of paragraphs A1-A26, wherein the insulating ceramic panel (30) has a panel density of at least one of:
   (i) at least 0.1 grams per cubic centimeter (g/cc), at least 0.2 g/cc, at least 0.3 g/cc, at least 0.4 g/cc, at least 0.5 g/cc, at least 0.6 g/cc, at least 0.7 g/cc, or at least 0.8 g/cc; and
   (ii) at most 1 g/cc, at most 0.9 g/cc, at most 0.8 g/cc, at most 0.7 g/cc, at most 0.6 g/cc, at most 0.5 g/cc, at most 0.4 g/cc, at most 0.3 g/cc, or at most 0.2 g/cc.

A28. The insulating ceramic panel (30) of any of paragraphs A1-A27, wherein the insulating ceramic panel (30) has a panel thermal conductivity of at least one of:
   (i) at least 0.05 watts per meter Kelvin (W/mK), at least 0.1 W/mK, at least 0.2 W/mK, at least 0.3 W/mK, or at least 0.4 W/mK; and
   (ii) at most 0.5 W/mK, at most 0.4 W/mK, at least 0.3 W/mK, at most 0.2 W/mK, or at most 0.1 W/mK.

A29. The insulating ceramic panel (30) of any of paragraphs A1-A28, wherein the insulating ceramic panel (30) is an exhaust insulation panel for an afterburner (28).

A30. An afterburner (28) including the exhaust insulation panel of paragraph A29.

A31. A craft (10) including the afterburner (28) of paragraph A30.

B1. A method (100) of forming an insulating ceramic panel (30), the method (100) comprising:
   binder jet printing (120) a printed panel that includes a plurality of hollow particles (50) and a binder jet binder material (80) that attaches each hollow particle (50) of the plurality of hollow particles (50) to at least one other hollow particle (50) of the plurality of hollow particles (50);
   infusing (150) an interstitial void volume fraction of the printed panel with an oxide binder material solution, which includes an oxide binder material (70) and a solvent, to define a solution-infused panel; and
   heating (170) the solution-infused panel to generate the insulating ceramic panel (30), wherein the heating (170) includes:
   (i) evaporating the solvent;
   (ii) degrading the binder jet binder material (80);
   (iii) depositing the oxide binder material (70) on the plurality of hollow particles (50) such that the oxide binder material (70) attaches each hollow particle (50) of the plurality of hollow particles (50) to at least one other hollow particle (50) of the plurality of hollow particles (50); and
   (iv) fusing the plurality of hollow particles (50) to one another to define the insulating ceramic panel (30).

B2. The method (100) of paragraph B1, wherein, prior to the binder jet printing (120), the method (100) further includes purifying (110) a hollow particle supply to separate the plurality of hollow particles (50) from a remainder of the hollow particle supply.

B3. The method (100) of paragraph B2, wherein the purifying (110) includes selecting a subset of the hollow particle supply as the plurality of hollow particles (50).

B4. The method (100) of paragraph B3, wherein the selecting the subset of the hollow particle supply includes screening the hollow particle supply to generate the plurality of hollow particles (50).

B5. The method (100) of any of paragraphs B2-B4, wherein the purifying (110) includes selectively separating a fines fraction of the hollow particle supply from the hollow particle supply to generate the plurality of hollow particles (50), wherein the fines fraction of the hollow particle supply has an average equivalent fines diameter that is less than a threshold fines diameter, optionally wherein the threshold fines diameter is 10 micrometers (μm), 20 μm, 30 μm, 40 μm, 50 μm, 75 μm, 100 μm, 200 μm, 300 μm, or 400 μm.

B6. The method (100) of any of paragraphs B2-B5, wherein the purifying (110) includes selectively separating a coarse fraction of the hollow particle supply from the hollow particle supply to generate the plurality of hollow particles (50), wherein the coarse fraction of the hollow particle supply has an average equivalent coarse diameter that is greater than a threshold coarse diameter, optionally wherein the threshold coarse diameter is 500 μm, 450 μm, 400 μm, 350 μm, 300 μm, 250 μm, 200 μm, 150 μm, 100 μm, or 50 μm.

B7. The method (100) of any of paragraphs B2-B6, wherein the purifying (110) includes selectively separating broken hollow particles from the hollow particle supply to generate the plurality of hollow particles (50).

B8. The method (100) of paragraph B7, wherein the separating the broken hollow particles includes at least one of floating the plurality of hollow particles (50) and centrifuging at least a subset of the hollow particle supply.

B9. The method (100) of any of paragraphs B1-B8, wherein the binder jet printing (120) includes additively manufacturing the printed panel.

B10. The method (100) of any of paragraphs B1-B9, wherein the binder jet printing (120) includes repeatedly:
(i) forming a thin layer of hollow particles (50); and
(ii) selectively positioning the binder jet binder material (80) within the thin layer of hollow particles (50) to selectively bind a subset of the thin layer of hollow particles (50) to one another.

B11. The method (100) of any of paragraphs B1-B10, wherein the binder jet binder material (80) is water-insoluble.

B12. The method (100) of any of paragraphs B1-B11, wherein the binder jet binder material (80) is at least one of:
(i) polymeric; and
(ii) phenolic.

B13. The method (100) of any of paragraphs B1-B12, wherein the binder jet binder material (80) is selected to degrade when subjected to temperatures of at most 150 degrees Celsius (° C.), at most 200° C., at most 250° C., at most 300° C., at most 350° C., or at most 400° C.

B14. The method (100) of any of paragraphs B1-B13, wherein, subsequent to the binder jet printing (120) and prior to the infusing (150), the method (100) further includes curing (140) the printed panel.

B15. The method (100) of paragraph B14, wherein the curing (140) the printed panel includes heating the printed panel, optionally wherein the heating the printed panel includes heating to a cure temperature of at least one of:
(i) at least 100° C., at least 125° C., at least 150° C., at least 175° C., or at least 200° C.; and
(ii) at most 300° C., at most 250° C., or at most 200° C.

B16. The method (100) of any of paragraphs B1-B15, wherein, subsequent to the binder jet printing (120) and prior to the infusing (150), the method (100) further includes cleaning (130) the printed panel, optionally wherein the cleaning (130) includes removing unattached hollow particles (50) from the printed panel.

B17. The method (100) of any of paragraphs B1-B16, wherein the infusing (150) includes positioning the oxide binder material solution within the interstitial void volume fraction of the printed panel.

B18. The method (100) of any of paragraphs B1-B17, wherein the infusing (150) includes immersing the printed panel within the oxide binder material solution.

B19. The method (100) of any of paragraphs B1-B18, wherein the infusing (150) includes vacuum infiltrating the oxide binder material (70) into the printed panel.

B20. The method (100) of any of paragraphs B1-B19, wherein the oxide binder material (70) includes, consists of, or consists essentially of at least one of:
(i) a metal oxide hydroxide;
(ii) a metal oxide hydrate;
(iii) an alumina hydrate;
(iv) an aluminum oxide hydroxide; and
(v) an alumina boehmite.

B21. The method (100) of any of paragraphs B1-B20, wherein the solvent includes, consists of, or consists essentially of water.

B22. The method (100) of any of paragraphs B1-B21, wherein the infusing (150) is performed subsequent to the binder jet printing (120) and prior to the heating (170) the solution-infused panel.

B23. The method (100) of any of paragraphs B1-B22, wherein the heating (170) includes heating to a threshold fusing temperature, optionally wherein the threshold fusing temperature is at least one of:
(i) at least 800° C., at least 900° C., at least 1,000° C., at least 1,100° C., at least 1,200° C., at least 1,300° C., at least 1,400° C., at least 1,500° C., at least 1,600° C., at least 1,700° C., at least 1,800° C., or at least 1,900° C.; and
(ii) at most 2,000° C., at most 1,800° C., at most 1,600° C., at most 1,400° C., at most 1,200° C., or at most 1,000° C.

B24. The method (100) of any of paragraphs B1-B23, wherein the evaporating includes drying the solution-infused panel for a threshold evaporation time at a threshold evaporation temperature.

B25. The method (100) of paragraph B24, wherein the threshold evaporation time is at least one of:
(i) at least 2 hours, at least 4 hours, at least 6 hours, at least 8 hours, at least 10 hours, or at least 12 hours; and
(ii) at most 24 hours, at most 20 hours, at most 16 hours, at most 14 hours, or at most 12 hours.

B26. The method (100) of any of paragraphs B24-B25, wherein the threshold evaporation temperature is at least one of:
(i) at least 50° C., at least 60° C., at least 70° C., at least 80° C., at least 90° C., or at least 100° C.; and
(ii) at most 200° C., at most 180° C., at most 160° C., at most 140° C., at most 120° C., or at most 100° C.

B27. The method (100) of any of paragraphs B1-B26, wherein the degrading the binder jet binder material (80) includes at least one of:
(i) evaporating the binder jet binder material (80);
(ii) oxidizing the binder jet binder material (80);
(iii) decomposing the binder jet binder material (80); and
(iv) melting the binder jet binder material (80).

B28. The method (100) of any of paragraphs B1-B27, wherein the depositing the oxide binder material (70) includes depositing metal oxide crystals within interface regions between adjacent hollow particles (50).

B29. The method (100) of paragraph B28, wherein the metal oxide crystals include alumina crystals.

B30. The method (100) of any of paragraphs B1-B29, wherein the fusing the plurality of hollow particles (50) to one another includes forming a plurality of adhesions within corresponding interface regions between adjacent hollow particles (50) of the plurality of hollow particles (50).

B31. The method (100) of any of paragraphs B1-B30, wherein the method (100) further includes supporting (160) a lower surface of the solution-infused panel during the heating (170).

B32. The method (100) of paragraph B31, wherein the lower surface of the solution-infused panel defines a lower surface contour, and further wherein the supporting (160) includes supporting with an upper surface of a support structure, wherein the upper surface of the support structure defines an upper surface contour that corresponds to the lower surface contour of the solution-infused panel.

B33. The method (100) of paragraph B32, wherein:
(i) the lower surface contour is a planar lower surface contour; and
(ii) the upper surface contour is a planar upper surface contour.

B34. The method (100) of any of paragraphs B32-B33, wherein:
(i) the lower surface contour is a non-planar lower surface contour; and
(ii) the upper surface contour is a non-planar upper surface contour.

B35. The method (100) of any of paragraphs B32-B34, wherein the method (100) further includes positioning a particulate material between the support structure and the solution-infused panel during the heating (170) to decrease a frictional force between the support structure and the solution-infused panel.

B36. The method (100) of paragraph B35, wherein the particulate material includes, consists of, or consists essentially of at least one of:
(i) a spherical, or at least substantially spherical, particulate material;
(ii) a calcined zirconia milling media; and
(iii) a high-temperature particulate material selected to remain solid during the heating (170).

B37. The method (100) of any of paragraphs B1-B36, wherein the insulating ceramic panel (30) includes any suitable structure of any of the insulating ceramic panels (30) of any of paragraphs A1-A31.

C1. The use of an oxide binder material (70) to attach a plurality of hollow particles (50) to one another within an insulating ceramic panel (30).

C2. The use of any of the insulating ceramic panels (30) of any of paragraphs A1-A31 with any of the methods (100) of any of paragraphs B1-1337.

C3. The use of any of the methods (100) of any of paragraphs B1-B37 with any of the insulating ceramic panels (30) of any of paragraphs A1-A31.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of forming an insulating ceramic panel, the method comprising:
   binder jet printing a printed panel that includes a plurality of hollow particles and a binder jet binder material that attaches each hollow particle of the plurality of hollow particles to at least one other hollow particle of the plurality of hollow particles;
   infusing an interstitial void volume fraction of the printed panel with an oxide binder material solution, which includes an oxide binder material and a solvent, to define a solution-infused panel; and
   heating the solution-infused panel to generate the insulating ceramic panel, wherein the heating includes:
   (i) evaporating the solvent;
   (ii) degrading the binder jet binder material;
   (iii) depositing the oxide binder material on the plurality of hollow particles such that the oxide binder material attaches each hollow particle of the plurality of hollow particles to at least one other hollow particle of the plurality of hollow particles; and
   (iv) fusing the plurality of hollow particles to one another to define the insulating ceramic panel.

2. The method of claim 1, wherein, prior to the binder jet printing, the method further includes purifying a hollow particle supply to separate the plurality of hollow particles from a remainder of the hollow particle supply, wherein the purifying includes at least one of:
   (i) selectively separating a fines fraction of the hollow particle supply from the hollow particle supply to generate the plurality of hollow particles, wherein the fines fraction of the hollow particle supply has an average equivalent fines diameter that is less than 10 micrometers ($\mu m$); and
   (ii) selectively separating a coarse fraction of the hollow particle supply from the hollow particle supply to generate the plurality of hollow particles, wherein the coarse fraction of the hollow particle supply has an average equivalent coarse diameter that is greater than 500 $\mu m$.

3. The method of claim 1, wherein, prior to the binder jet printing, the method further includes purifying a hollow particle supply to separate the plurality of hollow particles from a remainder of the hollow particle supply, wherein the purifying includes selectively separating broken hollow particles from the hollow particle supply to generate the plurality of hollow particles.

4. The method of claim 1, wherein, subsequent to the binder jet printing and prior to the infusing, the method further includes curing the printed panel.

5. The method of claim 1, wherein, subsequent to the binder jet printing and prior to the infusing, the method further includes cleaning the printed panel.

6. The method of claim 1, wherein the infusing includes positioning the oxide binder material solution within the interstitial void volume fraction of the printed panel.

7. The method of claim 1, wherein the infusing is performed subsequent to the binder jet printing and prior to the heating the solution-infused panel.

8. The method of claim 1, wherein the heating includes heating to a threshold fusing temperature of at least 900 Celsius.

9. The method of claim 1, wherein the degrading the binder jet binder material includes at least one of:
   (i) evaporating the binder jet binder material;
   (ii) oxidizing the binder jet binder material;
   (iii) decomposing the binder jet binder material; and
   (iv) melting the binder jet binder material.

10. The method of claim 1, wherein the depositing the oxide binder material on the plurality of hollow particles includes depositing metal oxide crystals within interface regions between adjacent hollow particles of the plurality of hollow particles.

11. The method of claim 1, wherein the fusing the plurality of hollow particles to one another includes forming a plurality of adhesions within corresponding interface regions between adjacent hollow particles of the plurality of hollow particles.

12. The method of claim 1, wherein:
   the plurality of hollow particles is formed from a hollow particle material that includes a metal oxide;
   the plurality of hollow particles:
   (i) defines an average equivalent particle diameter of at least 10 micrometers ($\mu m$) and at most 500 $\mu m$; and
   (ii) defines an average wall thickness of at least 3% and at most 30% of the average equivalent particle diameter; and
   the insulating ceramic panel defines:
   (i) a particle-enclosed void volume fraction that is enclosed within the plurality of hollow particles; and
   (ii) the interstitial void volume fraction is defined within an interstitial space among the plurality of hollow particles.

13. The method of claim 12, wherein the hollow particle material is a ceramic hollow particle material.

14. The method of claim 1, wherein:
   (i) the plurality of hollow particles defines a threshold particle mass fraction of the insulating ceramic panel, wherein the threshold particle mass fraction is at least 60% and at most 99%; and
   (ii) the oxide binder material defines a threshold binder material mass fraction of the insulating ceramic panel, wherein the threshold binder material mass fraction is at least 1% and at most 25%.

15. The method of claim 12, wherein:
   (i) the interstitial void volume fraction of the insulating ceramic panel is at least 10% and at most 75%; and
   (ii) the particle-enclosed void volume fraction of the insulating ceramic panel is at least 5% and at most 85%.

16. The method of claim 1, wherein the oxide binder material consists essentially of at least one of:
   (i) a metal oxide hydroxide;
   (ii) a metal oxide hydrate;

(iii) an alumina hydrate;
(iv) an aluminum oxide hydroxide; and
(v) an alumina boehmite.

17. The method of claim 1, wherein the oxide binder material consists essentially of at least one of an aluminum oxide and a crystalline aluminum oxide.

18. The method of claim 1, wherein the binder jet binder material differs from both the oxide binder material and a hollow particle material of the plurality of hollow particles.

19. The method of claim 1, wherein the insulating ceramic panel defines a first major surface and a second major surface that is opposed to the first major surface, wherein the insulating ceramic panel includes a plurality of cooling holes, wherein each cooling hole of the plurality of cooling holes extends between the first major surface and the second major surface, and further wherein at least one cooling hole of the plurality of cooling holes extends along an arcuate trajectory between the first major surface and the second major surface.

20. The method of claim 1, wherein the insulating ceramic panel is an exhaust insulation panel of an afterburner of a craft.

\* \* \* \* \*